United States Patent
Bartolo (10) Patent No.: US 10,876,455 B2
(45) Date of Patent: Dec. 29, 2020

(54) EXHAUST GAS PURIFICATION DEVICE, CORRESPONDING CONTROL PROCESS

(71) Applicant: Faurecia Systemes D'echappement, Nanterre (FR)

(72) Inventor: Xavier Bartolo, Étouvans (FR)

(73) Assignee: Faurecia Systemes D'echappement

( * ) Notice: Subject to any disclaimer, the term of this patent is extended or adjusted under 35 U.S.C. 154(b) by 0 days.

(21) Appl. No.: 15/946,005

(22) Filed: Apr. 5, 2018

(65) Prior Publication Data

US 2018/0291790 A1 Oct. 11, 2018

(30) Foreign Application Priority Data

Apr. 7, 2017 (FR) ..................................... 17 53056

(51) Int. Cl.
*F01N 3/24* (2006.01)
*F01N 3/20* (2006.01)
*F01N 3/28* (2006.01)

(52) U.S. Cl.
CPC .............. *F01N 3/24* (2013.01); *F01N 3/2013* (2013.01); *F01N 3/2828* (2013.01); *F01N 2240/16* (2013.01); *Y02A 50/20* (2018.01); *Y02T 10/12* (2013.01)

(58) Field of Classification Search
CPC ...... F01N 2240/16; F01N 3/2013; F01N 3/24; F01N 3/2828
See application file for complete search history.

(56) References Cited

U.S. PATENT DOCUMENTS

| | | | | |
|---|---|---|---|---|
| 4,276,066 A * | 6/1981 | Bly | ....................... | F01N 3/0214 55/287 |
| 4,373,330 A * | 2/1983 | Stark | ....................... | F01N 3/025 55/284 |
| 4,512,786 A * | 4/1985 | Sakurai | .............. | B01D 46/0063 422/178 |
| 4,872,889 A * | 10/1989 | Lepperhoff | ............. | F01N 3/027 55/282.3 |
| 4,948,403 A * | 8/1990 | Lepperhoff | ............. | F01N 3/027 55/282 |
| 5,472,462 A | 12/1995 | Pischinger et al. | | |
| 8,940,072 B2 * | 1/2015 | Boulet | ..................... | H05B 3/50 55/523 |

FOREIGN PATENT DOCUMENTS

DE 3613744 A1 10/1987
EP 3151633 A2 4/2017

OTHER PUBLICATIONS

Search Report for French Application No. 1753056 dated Nov. 7, 2017.

* cited by examiner

*Primary Examiner* — Anthony Ayala Delgado
(74) *Attorney, Agent, or Firm* — Carlson, Gaskey & Olds, P.C.

(57) ABSTRACT

The exhaust gas purification device for a vehicle comprises an exhaust gas purification member having a plurality of longitudinal circulation channels for the circulation of the exhaust gases, with each circulation channel having a free section. The device further includes a heater, comprised of a plurality of electrically conducting resistive wires engaged longitudinally each in one or several circulation channels, and a power source of the resistive wires. The resistive wires that are engaged in a same circulation channel occupy a total section smaller than 25% of the free section of the circulation channel.

15 Claims, 7 Drawing Sheets

EXHAUST GAS PURIFICATION DEVICE, CORRESPONDING CONTROL PROCESS

CROSS-REFERENCE TO RELATED APPLICATION

This application claims priority to FR 1753056, filed Apr. 7, 2017.

FIELD OF THE INVENTION

This invention generally related to exhaust line electric heating systems. More specifically, according to a first aspect, the invention related to an exhaust gas purification device for a vehicle.

BACKGROUND

DE 10 2008 029 526 describes an exhaust gas purification device with a catalyst of the SCR type, heated by resistive wires embedded in the material making up the catalyst.

Such a device has a significant thermal inertia.

SUMMARY OF INVENTION

In this context, the invention aims to propose a device for purifying exhaust gas equipped with heating, having a lower thermal inertia.

To that end, the invention relates to an exhaust gas purification device for a vehicle, the purification device comprising:
- an exhaust gas purification member having a plurality of longitudinal channels for circulation of exhaust gases, each circulation channel having a free section;
- a heater comprising a plurality of electrically conducting resistive wires engaged longitudinally each in one or several circulation channels and a power source of the resistive wires, the resistive wire(s) engaged in a same circulation channel occupying a total section smaller than 25% of the free section of the circulation channel;
- the purification member has an upstream face by which the exhaust gases penetrate the purification member and a downstream face by which the exhaust gases leave the purification member, the circulation channels extending longitudinally from the upstream face to the downstream face, the or each resistive wire being arranged in an S shape and comprising a plurality of successive longitudinal segments connected to one another by switchbacks, each longitudinal segment extending from the upstream face to the downstream face.

Because the resistive wires are engaged in the circulation channels, they directly heat the surface coating of the purification member, which contains the active elements. In the purification device of DE 10 2008 029 526, the resistive wires must first heat the material making up the catalyst, the heat next diffusing by conduction to the surface coating. The thermal inertia of the device according to the invention is therefore much lower.

The purification device may further have one or more of the features below, considered individually or according to any technical possible combination(s):
- the circulation channels are open at opposite longitudinal ends;
- at least 40% of the circulation channels are traveled by at least one resistive wire;
- each resistive wire does not include an electrically insulating layer;
- each resistive wire has a section smaller than 0.25 mm$^2$, each circulation channel having a free section smaller than 10 mm$^2$;
- two successive segments of a same resistive wire are engaged in different circulation channels;
- each circulation channel contains no more than a single segment;
- the segments of a same resistive wire are arranged two per circulation channel;
- a maintaining element is passed through the switchback connecting the segments arranged in a same circulation channel to one another;
- the power source comprises at least one first distributor at a first electric potential and at least one second distributor at a second electric potential, the or each first distributor and the or each second distributor being mounted on the upstream face or on the downstream face, at least some of the resistive wires each being electrically connected by an upstream end to the or one of the first distributors and by a downstream end to the or one of the second distributors;
- the or each first distributor is a connecting strip and the or each second distributor is a connecting strip, the largest part of the connecting strips extending along a same main direction, the resistive wires connected to said connecting strips being arranged in a plane perpendicular to the main direction;
- the first and second distributors are grids arranged parallel to the upstream face or the downstream face;
- the ends of the channels are reinforced.
- each resistive wire includes an electrically insulating layer or a corrosion protection layer;
- the two segments arranged in a channel are successive;
- the maintaining element is not electrically conductive or is placed in equipotential switchbacks;
- each strip forming one of the first distributors is connected at least at one power supply point to an electrical energy source at the first potential, the conductive section of said strip decreasing from the or each power supply point;
- each strip forming one of the second distributors is connected to an element at the second electrical potential at least at one point of contact, the conductive section of said strip decreasing from the or each point of contact.

According to a second aspect, the invention relates to a vehicle exhaust line equipped with an exhaust gas purification device having the above features. According to a third aspect, the invention relates to a method for controlling a device having the above features, the method comprising the following steps:
- acquiring the intensity of the electric current powering the resistive wires and the voltage across the terminals of the resistive wires;
- determining the temperature of the resistive wires by using the acquired current intensity and voltage;

According to a fourth aspect, the invention relates to another method for controlling a device having the above features, the method comprising the following steps:
- supplying electricity to the resistive wires;
- acquiring the intensity of the electric current powering the resistive wires and the voltage across the terminals of the resistive wires, when the device is at a known determined temperature;

evaluating the resistance of the resistive wires by using the acquired current intensity and voltage;

detecting any damage of the resistive wires by using the evaluated resistance.

According to a fifth aspect, the invention relates to a method for controlling a device having the above features, the method comprising the following steps:

supplying electricity to the resistive wires;

acquiring the intensity of the electric current powering the resistive wires and the voltage across the terminals of the resistive wires, under conditions where the resistive wires generate a negligible quantity of heat;

determining the temperature of the exhaust gases by using the acquired current intensity and voltage.

According to a sixth aspect, the invention relates to a method for controlling a device having the above features, the method comprising the following steps:

supplying electricity to the resistive wires;

acquiring the intensity of the electric current powering the resistive wires and the voltage across the terminals of the resistive wires;

determining the temperature of the resistive wires by using the acquired current intensity and voltage;

determining a theoretical temperature of the resistive wires, which would be reached without the circulation of the exhaust gases;

determining the exhaust gas flow rate using the temperature of the resistive wires previously determined and the theoretical temperature of the resistive wires previously determined.

BRIEF DESCRIPTION OF THE DRAWINGS

Other features and advantages of the invention will emerge from the detailed description thereof provided below, for information and non-limitingly, in reference to the appended figures, in which.

DETAILED DESCRIPTION

Figure 1:
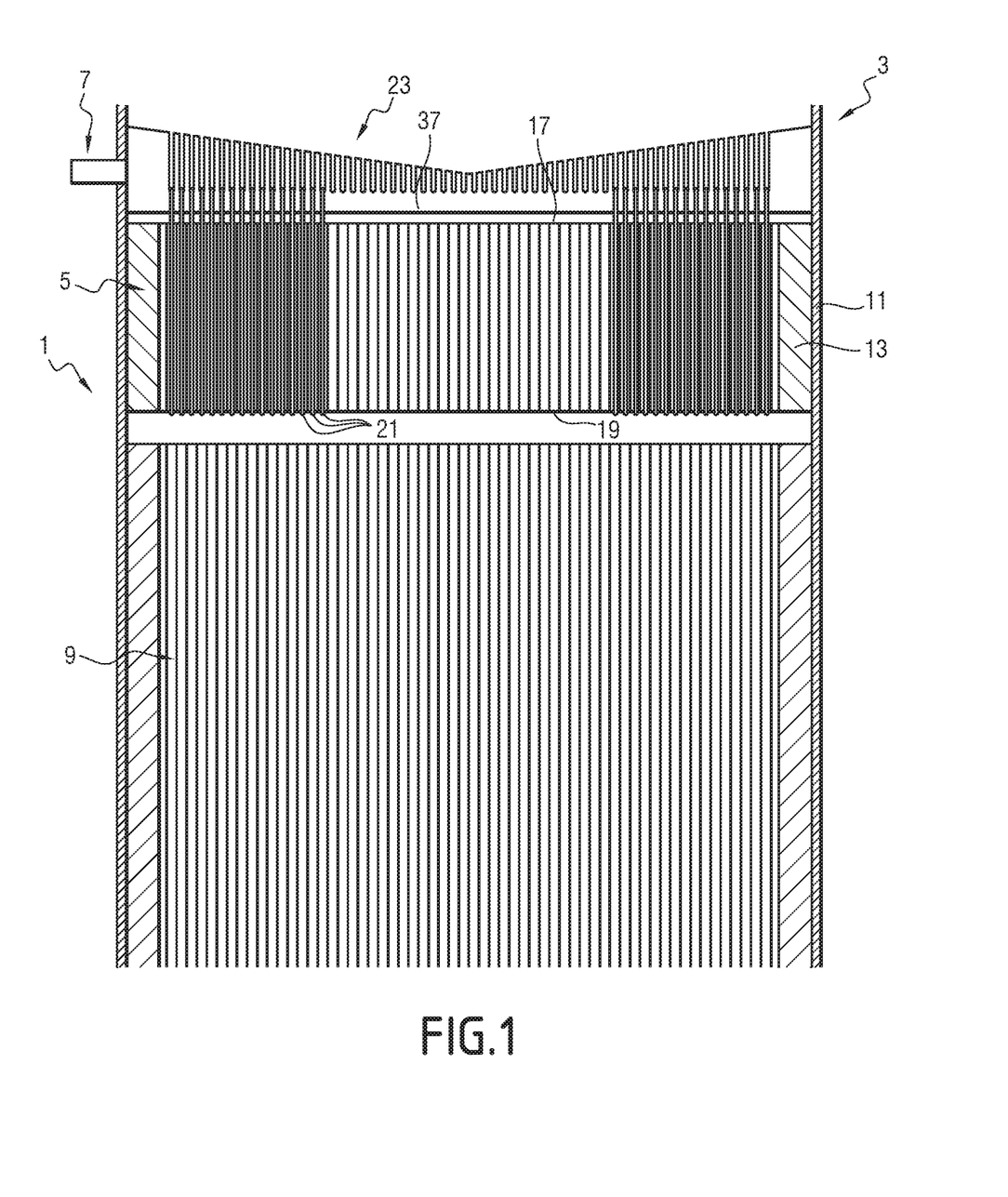
FIG. 1 is a simplified, sectional illustration of a purification device according to the invention.

The purification device 1 shown in FIG. 1 is intended to be inserted in the exhaust line 3 of a vehicle.

This vehicle is typically equipped with a heat engine. The vehicle is a motor vehicle, for example a truck or car.

The purification device 1 is fluidly coupled in an upstream direction to a manifold (not shown) of an exhaust line, which captures the gases leaving combustion chambers of the engine.

The purification device 1 is fluidly connected in a downstream direction to a cannula (not shown) by which the purified exhaust gases are released into the atmosphere.

As shown in FIG. 1, the purification device 1 comprises at least an exhaust gas purification member 5 and the heater 7.

The heater 7 is provided to heat the purification member 5.

The purification member 5 is of any type: SCR catalyst, 3-way catalyst (TWC), DOC (Diesel Oxidation Catalyst), NOx or NSC absorber (NOx Storage Catalyst), etc.

In the illustrated example embodiment, the purification device 1 further includes another purification member 9, placed downstream from the purification member 5. Only the purification member 5 is heated directly.

In the present application, upstream and downstream will be understood relative to the normal flow direction of the exhaust gases in the exhaust line.

The other purification member 9 is typically of the same type as the purification member 5.

Alternatively, the other purification member 9 is of a different type: it, for example, has a different impregnation (different superficial active layer, CPSI (Cells Per Square Inch), etc. Typically, the purification member 5 and the other purification member 9 are provided to treat the same pollutant.

Because the purification member 5 is heated, it quickly reaches its minimum operating temperature when the vehicle is started. The other purification member 9, not heated, has a larger volume. It is heated solely by the heat given off by the exhaust gases. It therefore reaches its minimum operating temperature more slowly than the purification member 5.

Thus, after starting up the vehicle, in a first phase, the purification member 5 removes pollutants from the exhaust gases. The other purification member 9 takes over, once it reaches its minimum operating temperature.

In the example embodiment of FIG. 1, the purification member 5 is placed inside the duct 11, with an inserted maintaining layer 13 located between the purification member 5 and the duct 11. The other purification member 9 is mounted in the same way.

Figure 2:
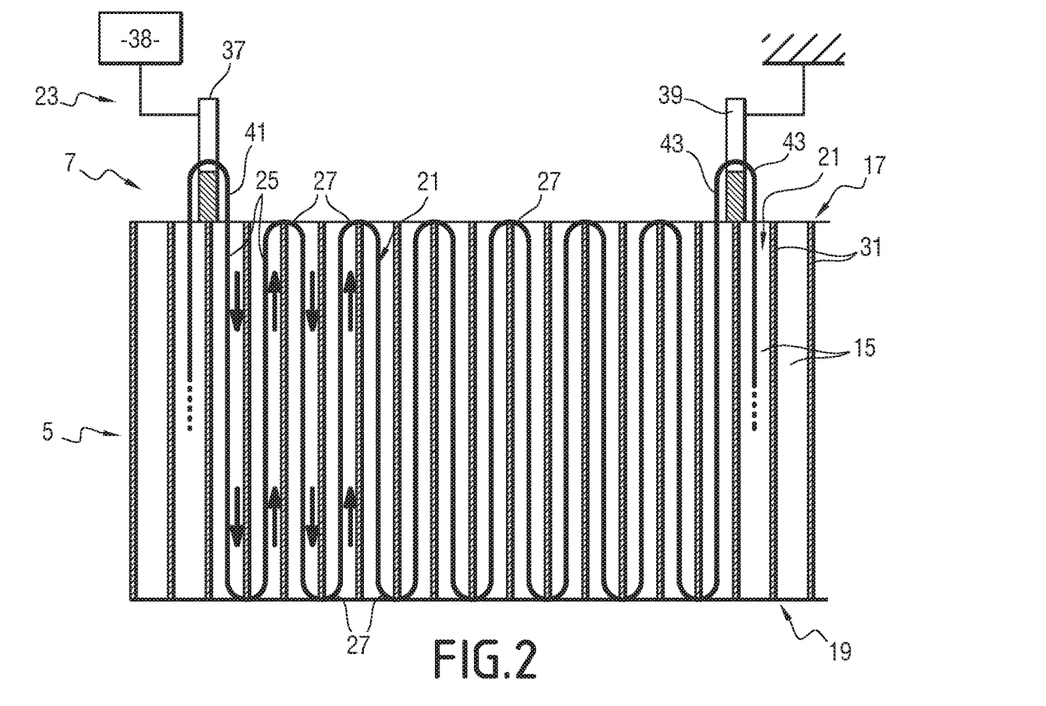
FIG. 2 is a view showing the arrangement of the conductive resistive wires for a first embodiment of the invention.

The purification member 5 includes a plurality of longitudinal flow channels for the exhaust gases 15, more clearly visible in FIG. 2.

The purification member 5 includes a large number of longitudinal channels 15, typically from 1500 to 10,000, preferably from 1800 to 4000.

The purification member 5 has an upstream face 17 by which the exhaust gases penetrate the purification member 5, and a downstream face 19 by which the exhaust gases leave the purification member 5. The channels 15 extend longitudinally from the upstream face 17 to the downstream face 19, i.e., over the entire longitudinal length of the purification member 5.

Each channel 15 is free over its entire length, i.e., is not closed by an internal partition. Each channel 15 is open at its opposite longitudinal ends.

The heater 7 comprises a plurality of electrically conducting resistive wires 21, engaged longitudinally each in one or several circulation channels 15, and a power source 23 of the resistive wires 21.

The resistive wires 21 are engaged in the circulation channels 15 in that they are arranged inside the channels 15, in the free section of each channel 15. They are not arranged in the solid material making up the purification member 5.

Each circulation channel 15 has a given free section. This free section is typically smaller than 10 mm$^2$, preferably smaller than 5 mm$^2$, and still more preferably smaller than 2.5 mm$^2$.

The resistive wires 21 engaged in a same circulation channel 15 occupy a total section smaller than 25% of the free section of said circulation channel, preferably smaller than 15%, and still more preferably smaller than 5% of the free section.

This means that the section of the resistive wire, or the sum of the sections of the resistive wires engaged in a given circulation channel, is smaller than 25%, or 15%, or 5% of the free section of said channel.

To that end, each resistive wire 21 advantageously has a section smaller than 0.25 mm$^2$, typically comprised between 0.002 mm$^2$ and 0.05 mm$^2$.

At least 40% of the circulation channels 15 are traveled by at least one resistive wire 21, preferably at least 60%, still more preferably at least 80%, and still more preferably at least 90%.

Thus, the principle of the invention is to distribute a large number of resistive wires with small sections in the largest part of the channels of the purification member.

A first advantage is that using wires with small sections makes it possible to obtain a large heating surface. This result is obtained without increasing the back pressure for gases passing through the purification member 5, since the section of the resistive wire(s) within a given channel remains much smaller than the free section of the channel.

Furthermore, the fact that the wires are distributed in a large number of channels allows uniform heating of the purification member 5, i.e., distributed substantially in the entire mass of the purification member 5.

Arranging the wires inside channels means that these resistive wires will directly heat the superficial layer of each channel (wash coat), which contains the catalytic material. This is particularly true when the wires are arranged so as to heat essentially in a radiative manner.

To that end, the resistive wires 21 are made from a material chosen from among FeCrAl and its alloys, NiCr and its alloys, stainless steel or inconel. Thus, the wires are made from a material withstanding high temperatures and oxidation in an environment containing exhaust gases. For example, the resistive wires 21 are made from Kanthal®A1, Nichrotal®, or Nichrome 80.

The resistive wires are traveled by an electrical current chosen to bring the wires to a temperature comprised between 300° C. and 1300° C., preferably comprised between 500 and 1000° C.

Depending on the temperature reached by the heating wires, the material making up the purification member is heated in an essentially radiative manner (high temperature, for example a temperature above 800° C.), or conversely, in an essentially convective manner (low temperature, for example a temperature below 500° C.).

Typically, each resistive wire 21 does not include an electrically insulating layer or a corrosion protection layer.

Alternatively, each resistive wire 21 includes an electrically insulating layer and/or a corrosion protection layer.

Figure 3:
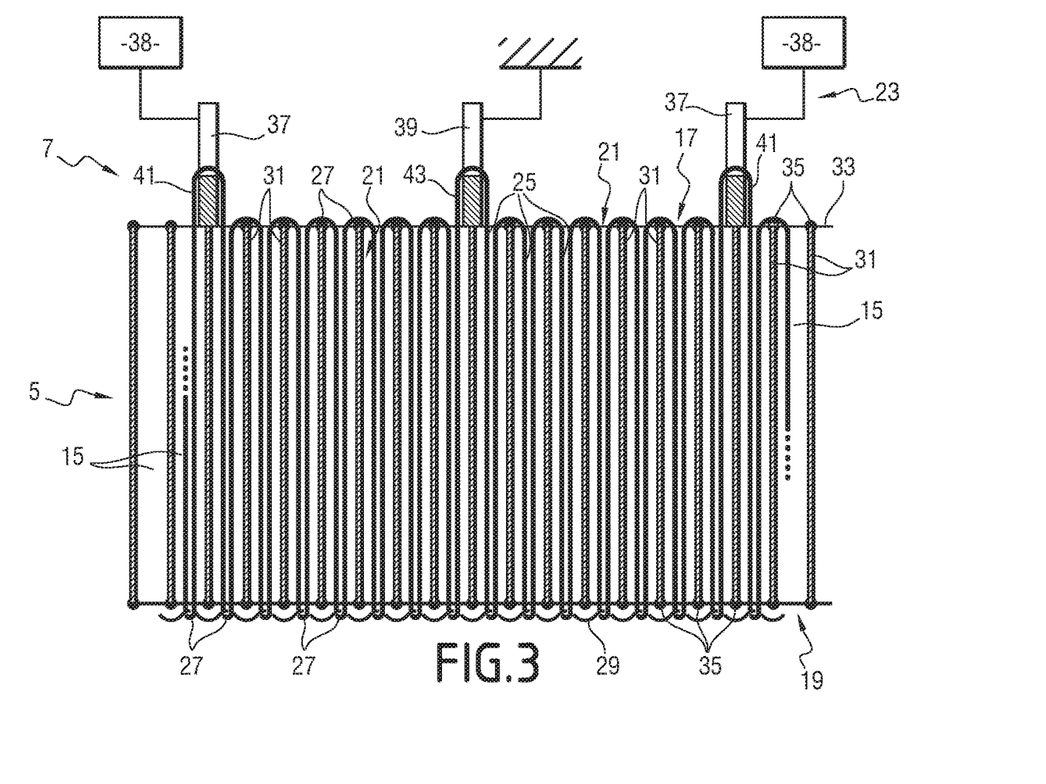
FIG. 3 is a view similar to that of FIG. 2, showing the arrangement of the resistive wires for a second embodiment of the invention.

As shown in FIGS. 1 to 3, each resistive wire 21 is arranged in S shape, and comprises a plurality of successive longitudinal segments 25 connected to each other by switchbacks 27. Each wire 21 is thus folded in an accordion, the switchbacks 27 each being U-shaped.

Each longitudinal segment 25 extends from the upstream face 17 to the downstream face 19 of the purification member 5, and is engaged in one of the circulation channels 15.

According to a first embodiment of the invention illustrated in FIG. 2, two successive segments 25 of a same resistive wire 21 are engaged in different channels 15.

Each channel 15 contains no more than a single segment 25.

According to the second embodiment of the invention, illustrated in FIG. 3, the longitudinal segments 25 of a same resistive wire 21 are engaged two per channel 15. The two segments 25 arranged in a same channel 15 are typically successive segments along the wire 21.

In this embodiment, the switchback 27 connecting the two longitudinal segments 25 housed in the same channel 15 to each other protrudes outside the channel 15. In the illustrated example, this switchback protrudes relative to the downstream face 19 of the purification member 5.

To block this switchback 27 in position and prevent it from being able to withdraw inside the channel 15, a maintaining element 29 is placed in the switchback 17.

Conversely, the switchback 27 connecting two successive longitudinal segments 21 situated in different channels 15 to each other straddles the end of a partition 31 separating the two channels 15 from each other. It therefore cannot be retracted toward the inside of one of the channels 15.

The maintaining element 29 typically enters several switchbacks 27, all belonging to the same resistive wire 21 or belonging to different resistive wires 21.

The maintaining element 29 is for example a wire, as shown in FIG. 3, or a rigid rod, or a trellis or of any other appropriate type.

The maintaining element 29 is not electrically conductive, or is placed in equipotential switchbacks 27.

The switchbacks 27 are said to be equipotential if they are all at the same electrical potential.

As shown in FIG. 3, the longitudinal ends of the channels 15 are reinforced.

More specifically, the partitions 31 separating the channels 15 from each other have longitudinal ends covered with a material 35 making it possible to protect them from erosion or wear caused by rubbing of the switchbacks 27 straddling these partitions.

Typically, the longitudinal ends of all of the partitions 31 are coated with a protective coating 35. These partitions are preferably protected at both of their longitudinal ends, namely at the upstream face 17 and the downstream face 19.

The protective coating 35 extends longitudinally over several millimeters, for example for 1 to 5 mm.

The protective coating 35 is typically a resin with a composition chosen to withstand the temperatures to which the purification member is exposed.

For example, the protective coating 35 is obtained by submerging the upstream face 17 and/or the downstream face 19 of the purification member 5 in a liquid resin bath, over a depth of several millimeters.

The resin is next polymerized.

The total outer surface of the resistive wires is determined based on the rated operating temperature of the resistive wires, the number of channels traveled by each resistive wire, the geometry of the channels and in particular their lengths and their free sections, the total number of channels, the emissivity of the resistive wires, and the total rated electric power. The total outer surface required determines the diameter of the resistive wire. The electric voltage of the electrical power supply will influence the total length of each resistive wire, considered between a power supply point of the wire connected to an electrical energy source and another point of the wire connected to the ground. This length will determine the number of channels traveled by each resistive wire.

For example, to heat a catalyst of the 400CPSI type, with a diameter of 4 inches and a longitudinal length of 20 mm, with an electrical power supply having a power of 5 kilowatts under 48 volts, using nichrome wires 80 heated to 1000° C., wires are used with a diameter of about 0.01 mm. Each wire, considered between the power supply point and the point connected to the ground, has a length of about 50 cm and therefore travels between 20 and 30 channels.

The electrical power supply 23 comprises at least a first distributor 37 at a first electric potential, as shown in FIGS. 2 to 6, and at least one second distributor 39 at a second electric potential. The or each first distributor 37 and the or each second distributor 39 are mounted on the upstream face 17 of the purification member in the example shown in FIGS. 2 to 6.

Alternatively, the or each first distributor 37 and the or each second distributor 39 are mounted on the downstream face 19.

At least some of the resistive wires 21 are electrically connected by an upstream end 41 to the or one of the first distributors 37 and by a downstream end 43 to the or one of the second distributors 39.

Typically, each resistive wire 21 is connected by its upstream end 41 to the or one of the first distributors, and by its downstream end 43 to the or one of the second distributors.

The or each first distributor 37 is also electrically connected to an electrical energy source, which is for example the electrical battery of the vehicle. Alternatively, it is another energy source.

The electric energy source typically provides a direct or choppy current, under a voltage depending on the vehicle (12, 48 or 400 volts, for example).

The or each second distributor 39 is typically electrically connected directly to the ground, or is combined with the ground.

In the embodiment shown in FIGS. 2 to 6, the or each first distributor 37 is a strip and the or each second distributor 39 is a strip.

In this case, the electrical power supply typically includes several strips forming a first distributor 37 and several strips forming a second distributor 39. The strips extend in a same main direction, and are therefore parallel to each other.

As shown in the figures, the strips, in a transverse direction perpendicular to the longitudinal direction and the main direction, are regularly spaced apart from each other.

The strips forming a first distributor 37 and the strips forming a second distributor 39 alternate transversely, i.e., each one forming a first distributor is positioned between two strips forming a second distributor, and conversely each strip forming a second distributor is positioned between two strips forming a first distributor.

In this case, the resistive wires 21 connected to said strips are each arranged in a plane perpendicular to the main direction.

Typically, the upstream end 41 of each resistive wire is connected to a strip 37 forming a first distributor, and its downstream end 43 is connected to a strip forming an adjacent second distributor 39 of said strip forming a first distributor 37.

Each strip is fastened to the purification member 5 using any appropriate method: by gluing, brazing, mechanical attachment, or any other method. Alternatively, it is the resistive wires 21 that keep the first and second distributors 37, 39 in place. In this case, it is necessary to create a sufficient voltage in the resistive wires 21 during their assembly through the purification member 5.

The first and second distributors 37, 39 are made from a conductive material and have a shape chosen so as not to consume, by joule effect, a significant fraction of the supplied electrical energy. Alternatively, the first and second distributors 37, 39 are used as an additional heat source, and dissipate, by joule effect, a fraction of the supplied electrical energy.

Figure 4:
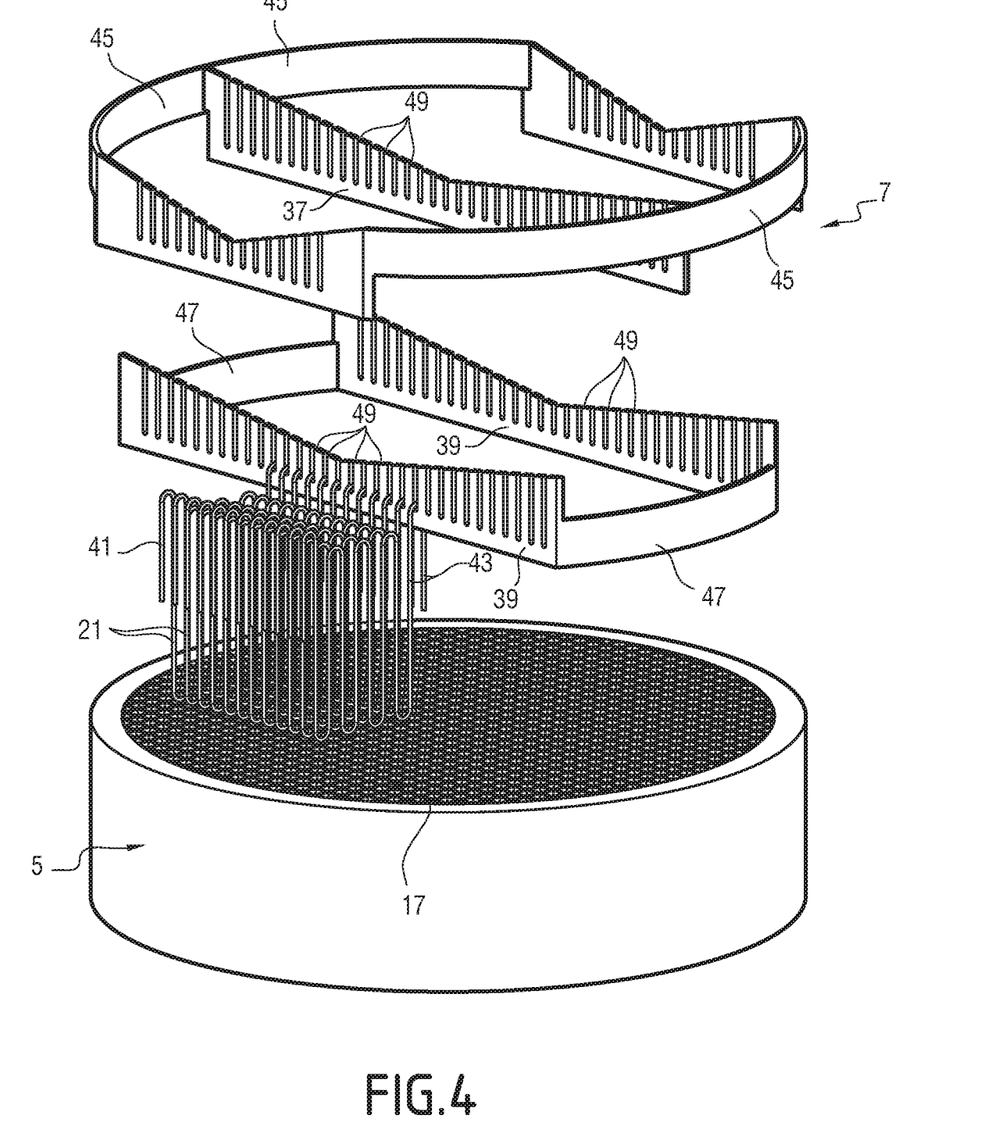
FIG. 4 is an exploded perspective schematic view showing a first embodiment of the power supply of the resistive wires, only two strips being shown.
Figure 5:
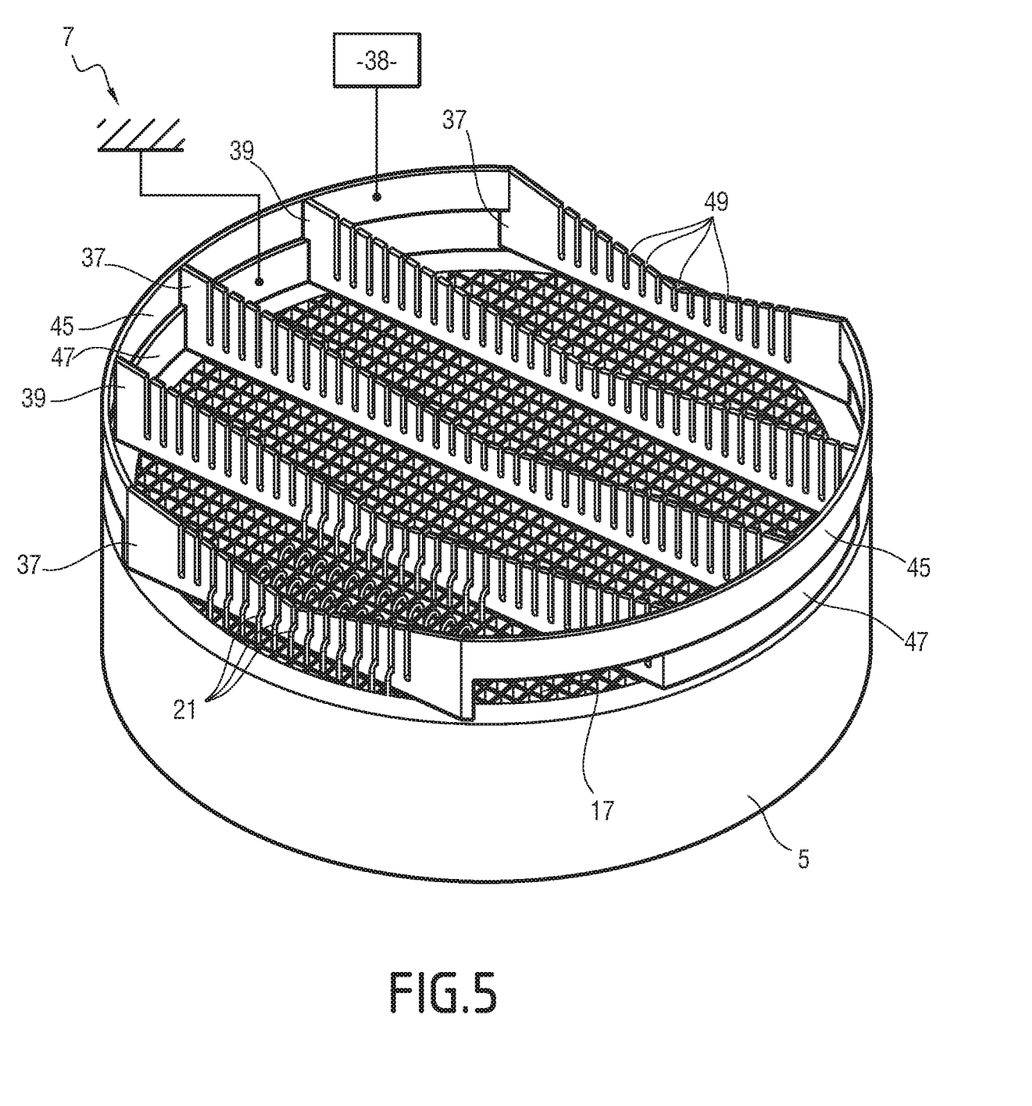
FIG. 5 is another perspective view showing the electrical power supply according to the first embodiment of the invention.

In the example shown in FIGS. 4 and 5, each first distributor 37 is electrically connected to the electrical energy source by its two opposite ends, via one or several electric tracks 45. Likewise, each second distributor 39 is connected by both of its ends to the ground, via one or several electric tracks 47.

Each strip forming a first distributor 37 has a conductive section that decreases from the or each power supply point.

In the example illustrated in FIGS. 4 and 5, the conductive section of each strip forming a first distributor 37 decreases from its two opposite ends, and is minimal at the center of the strip.

Likewise, the conductive section of each strip forming a second distributor 39 decreases from the or each point of contact.

In the example illustrated in FIGS. 4 and 5, the conductive section of each strip forming a second distributor 39 decreases from its two opposite ends, and is therefore minimal at the center of the strip.

The ends 41 and 43 of each resistive wire 21 are attached to the first and second distributors 37, 39 by any appropriate method. In the example shown in FIGS. 4 and 5, the ends 41 and 43 are forcibly inserted in slits 49 cut in the first and second distributors 37, 39. Alternatively, the ends 41 and 43 are attached by welding or brazing on the first and second distributors 37, 39. According to another alternative, the ends 41 and 43 of each wire are not rigidly attached, but are simply mechanically in contact with the first and second distributors 37, 39.

Figure 6:
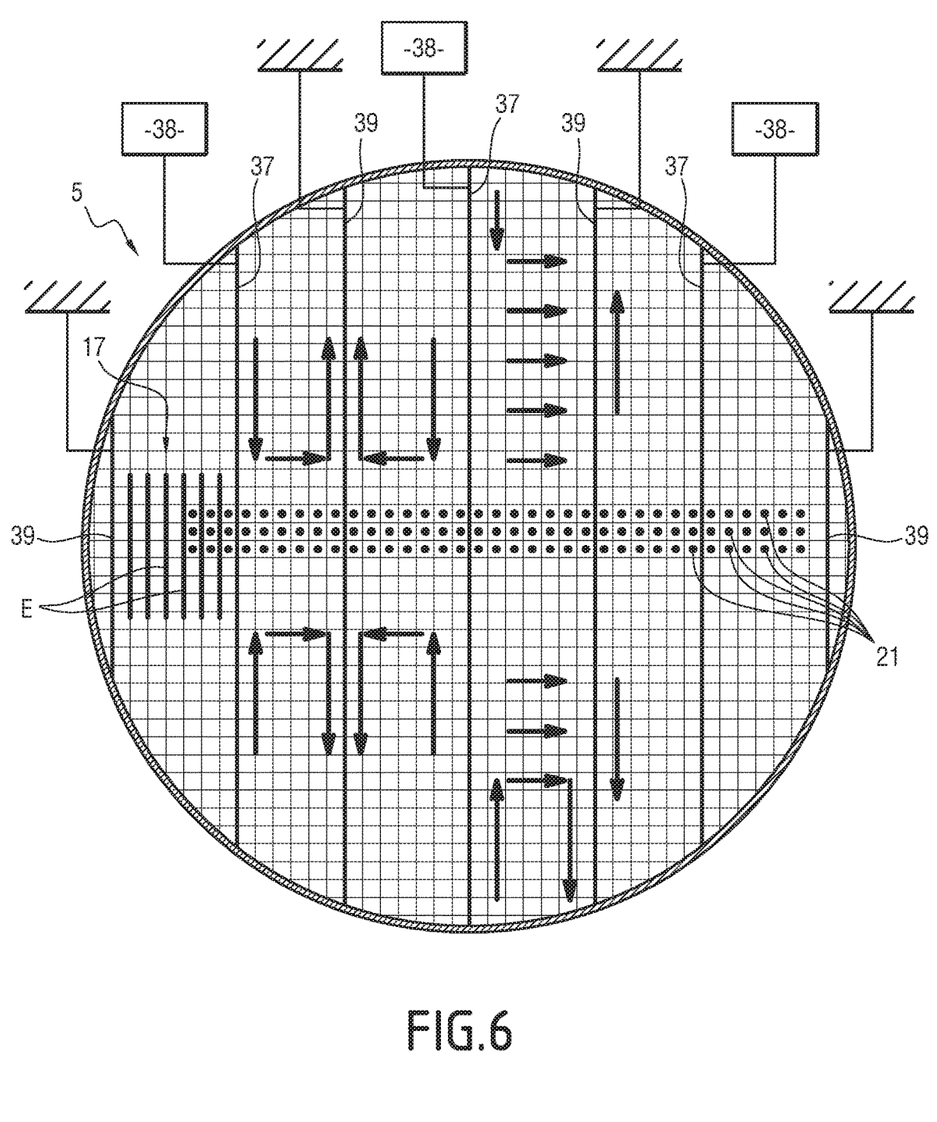
FIG. 6 is a schematic front view of the upstream face of the purification member equipped with the electrical power supply of FIGS. 4 and 5.

The circulation direction of the electrical current in the power supply 7 and in the resistive wires 21 is shown by arrows in FIG. 6. The electric current is brought by the first distributors 37, and transmitted to the wires 21 by the upstream ends 41 of the resistive wires. The electric current next travels each resistive wire 21 over its entire length, to the downstream end 43. The downstream end 43 transmits the electric current in the second distributor 39, the latter discharging the electric current to the ground.

In the arrangement described above, namely with each resistive wire arranged in a plane perpendicular to the main direction, the equipotential lines are lines parallel to the main direction. Some of these lines E are shown in FIG. 6.

Each line connects points belonging to wires arranged between the same pair of first and second distributors 37, 39. These points are situated, along each wire, at the same distance from the first distributor 37 and the same distance from the second distributor 39. They are therefore at the same electric potential.

Figure 7:
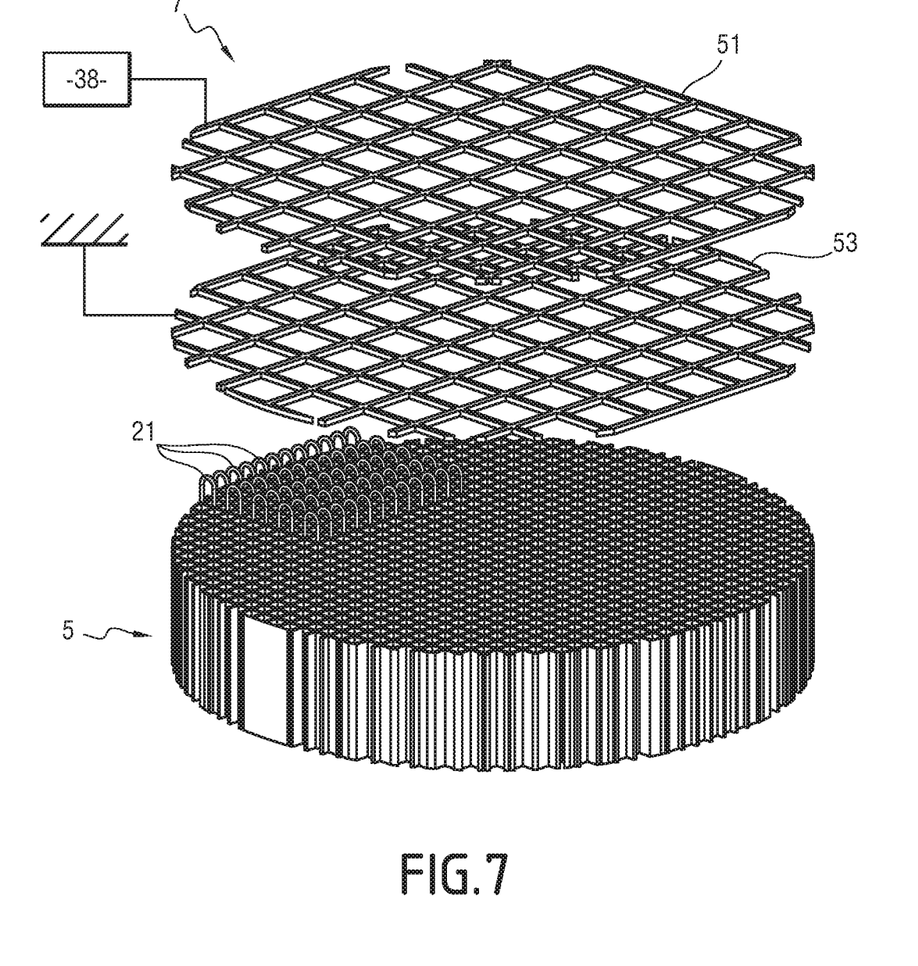
FIG. 7 is a perspective view similar to that of FIG. 5, for a second embodiment of the electrical power supply.

Alternatively, as shown in FIG. 7, the first and second distributors 37, 39 are grids. Typically, the electric power supply 23 then includes a single first distributor 37 and a single second distributor 39. The grids are positioned parallel to each other and across from either the upstream face 17 or the downstream face 19. They are therefore perpendicular to the longitudinal direction.

The upstream end 41 of each resistive wire 21 is connected by any appropriate method to the grid 51 forming a first distributor, and the downstream end 43 is connected by any appropriate method to the grid 53 forming a second distributor.

According to another embodiment that is not shown, the strips forming the first and second distributors are not made from a solid material, but are grids each positioned in a plane containing the longitudinal direction and the main direction.

It should be noted that, in order to adjust the quantity of heat given off or the electrical characteristics of the resistive wires to the geometry of certain zones of the purification member 5, it is possible to use, in these zones, resistive wires having characteristics different from those of the resistive wires used in the other zones.

For example, these resistive wires may have a different section and/or be made from a different material.

It should be noted that each resistive wire 21 can be made up of several segments secured to each other. For example, each segment can correspond to one or several longitudinal segments of the wire.

Conversely, several resistive wires can be integral, or secured to each other. For example, a resistive wire 21 connecting a strip forming a first distributor to a strip forming a second distributor can be integral with another resistive wire connecting said strip forming a second distributor to another strip forming a first distributor.

The purification device 1 advantageously includes a controller 55, configured to control the heater 7. The controller 55 is in particular configured to choose the voltage and the electric current that are provided by the electric current source 38 to the resistive wires, so as to keep the consumed heating power and/or electrical power within a predetermined range.

Typically, the controller 55 controls the heating by pulse width modulation (PWM).

The controller 55 is typically an information processing unit formed by a processor and a memory associated with the processor. Alternatively, the controller 55 is made in the form of programmable logic components such as FPGAs (Field Programmable Gate Arrays) or dedicated integrated circuits such as ASICs (Application-Specific Integrated Circuit).

The device 1 further includes a member that acquires the intensity of the electric current powering the resistive wires 21 and the voltage across the terminals of the resistive wires 21.

This member is of any suitable type.

For example, this member includes a sensor 57 for measuring electric current and a sensor 59 for measuring the electric voltage. Alternatively, the intensity of the electric current and the electric voltage are obtained by calculation, from information recovered in the controller 55.

Figure 8:
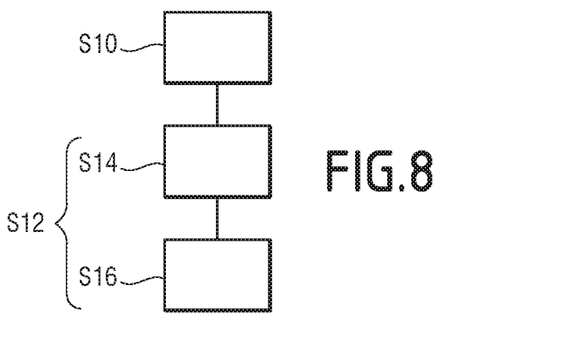
FIGS. 8 to 11 are step diagrams illustrating different methods for controlling the purification device according to the invention.

The controller 55 is advantageously configured to carry out a method comprising the following steps:
  acquiring the intensity of the electric current powering the resistive wires 21 and the voltage across the terminals of the resistive wires 21; and
  determining the temperature of the resistive wires 21 by using the acquired current intensity and voltage.

These steps correspond to steps S10 and S12 shown in FIG. 8. Step S10 is for example carried out using sensors 57 and 59.

Step S12 includes a sub-step S14 for determining the electric resistance of the resistive wires 21.

The electric resistance is determined by obtaining the ratio between the acquired electric voltage and the acquired electric intensity.

Step S12 further includes a sub-step S16 for determining the temperature of the resistive wires 21 by using the electric resistance previously determined in step S14.

Indeed, the electric resistance of the resistive wires 21 varies as a function of the temperature of resistive wires 21. Knowing the electric resistance therefore makes it possible to deduce the temperature of the resistive wires.

Step S12 is carried out by the controller 55, using any appropriate method, such as curves, tabulations, or determined mathematical formulas, and with the curves, tabulations or mathematical formulas being recorded in the memory of the controller 55.

This method is typically carried out while the heater 7 is operating at its rated power, and heats the purification member 5.

Figure 9:
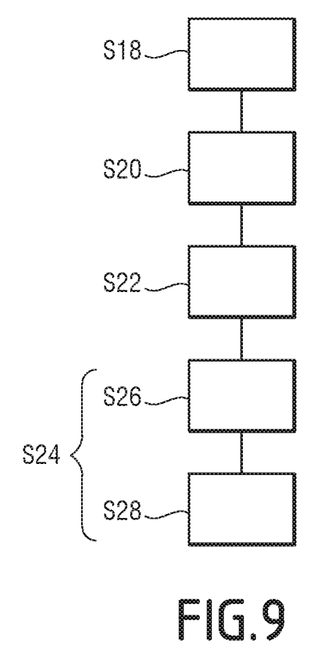

Additionally, or in place of the above method, the controller 55 is configured to carry out a method comprising the following steps, and which is shown in FIG. 9:
  supplying electricity to the resistive wires 21 (step S18);
  acquiring the intensity of the electric current powering the resistive wires 21 and the voltage across the terminals of the resistive wires 21, when the device 1 is at a known determined temperature (step S20);
  evaluating the resistance of the resistive wires 21 by using the acquired current intensity and voltage (step S22); and
  detecting any damage of the resistive wires 21 by using the evaluated resistance (step S24).

This method is for example carried out before the vehicle is started, when the engine is cold. The device is then at ambient temperature. This ambient temperature is measured by a temperature probe of the vehicle, and can be recovered by the controller 55 in the computer on board the vehicle.

Advantageously, the intensity and the voltage are acquired under conditions where the resistive wires do not generate heat, or generate a practically negligible quantity of heat.

For example, during step S18, the resistive wires 21 are electrically supplied with an electrical power below 10% of a rated operating electrical power of the device, preferably less than 5% of the rated power, still more preferably less than 1% of the rated electrical power.

Alternatively, the resistive wires 21 are electrically powered at a high power, but the intensity and the voltage are acquired just after starting up the electrical power supply, in the initial several milliseconds.

Step S20 is for example carried out using sensors 57 and 59.

In step S22, the resistance of the resistive wires is evaluated by obtaining the ratio between the electric voltage and electric intensity previously acquired.

Step S24 comprises a sub-step S26 for comparing the previously calculated resistance with a theoretical resistance of the resistive wires. The theoretical resistance is a predetermined value for the considered determined temperature, stored in the memory of the controller 55, or modeled by the controller 55 based on operating parameters.

Preferably, the considered determined temperature is low, typically below 40° C.

During the comparison sub-step S26, the difference is for example obtained between the evaluated resistance and the theoretical resistance, or the ratio between the evaluated resistance and the theoretical resistance.

Step S24 further includes a diagnostic sub-step S28 relative to any damage of the resistive wires. If the previously evaluated resistance deviates too much from the theoretical resistance, it is concluded that one or several resistive wires 21 are damaged. On the contrary, if the evaluated resistance and the theoretical resistance are close to each other, it is concluded that the resistive wires are not damaged. For example, a difference between the evaluated resistance and the theoretical resistance greater than 10% of the value of the theoretical resistance for the considered temperature will be considered to mean that one or several resistive wires are damaged. Similarly, a ratio between the evaluated resistance and the theoretical resistance small than 0.9 or greater than 1.1 will be considered to mean that one or several resistive wires are damaged.

Steps S22 and S24 are typically calculation steps, carried out by the controller 55.

Figure 10:
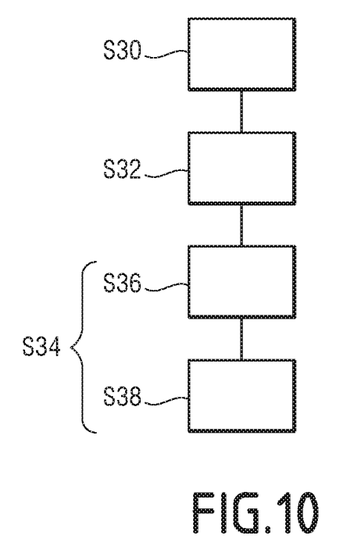

In addition to or in place of the methods described above, the controller 55 is advantageously configured to carry out a method that will be described below, and which is shown schematically by FIG. 10.

This method comprises at least the following steps:
supplying electricity to the resistive wires 21 (step S30);
acquiring the intensity of the electric current powering the resistive wires (21) and the voltage across the terminals of the resistive wires (21), under conditions where the resistive wires (21) generate a negligible quantity of heat (step S32); and
determining the temperature of the exhaust gases by using the acquired current intensity and voltage (step S34).

Typically, the present method aims to determine the temperature of the exhaust gases when the heater is no longer used to heat the purification member 5, but exhaust gases are circulating through the purification device 4. This is in particular the case when the purification device reaches its minimum operating temperature, and the exhaust gases suffice to keep the purification device hot.

The value of the electrical power supplying the resistive wires 21 in step S30 is for example chosen to be below 10% of a rated operating electrical power of the device, preferably less than 5% of the rated power, still more preferably less than 1% of the rated electrical power. These resistive wires are then at the temperature of the exhaust gases.

In step S32, the intensity of the current and the electric voltage across the terminals of the resistive wires 21 are acquired as described above, for example by using the probes 57, 59 or by directly calculating the current and voltage from properties available in the controller 55.

Step S34 includes a sub-step S36 during which the resistance of the resistive wires is evaluated, typically by obtaining the ratio between the acquired electric voltage and acquired electric intensity previously acquired.

Step S34 further includes a sub-step S38 during which the temperature of the resistive wires is evaluated as a function of the resistance previously calculated. This temperature is evaluated as described above, for mathematical formulas, curves or tabulations available in the memory of the controller 55.

The temperature thus evaluated corresponds to the temperature of the exhaust gases, because the resistive wires generate a zero or negligible quantity of heat.

Figure 11:
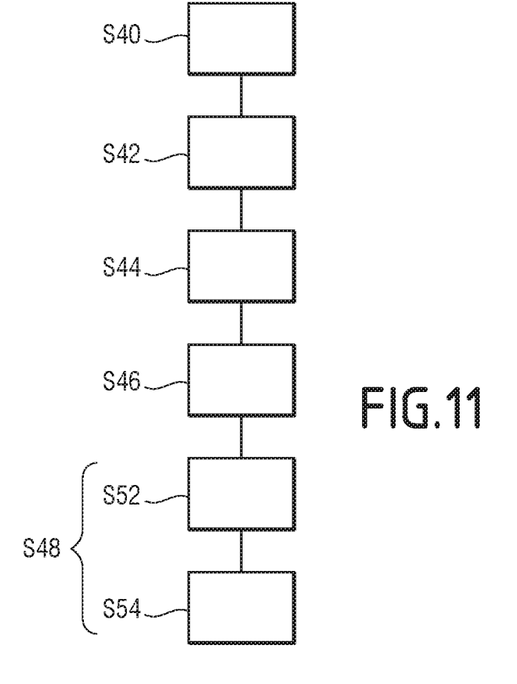

In addition to or in place of one of the methods described above, the controller 55 is advantageously configured to carry out the above method, shown in FIG. 11.

The process comprises the following steps:
supplying electricity to the resistive wires 21 (step S40);
acquiring the intensity of the electric current powering the resistive wires 21 and the voltage across the terminals of the resistive wires 21 (step S42);
determining the temperature of the resistive wires 21 by using the acquired current intensity and voltage (step S44);
determining a theoretical temperature of the resistive wires 21, which would be reached without the circulation of the exhaust gases (step S46); and
determining the exhaust gas flow rate using the temperature of the resistive wires 21 previously determined and the theoretical temperature of the resistive wires previously determined (step S48).

Thus, the method makes it possible to determine the exhaust gas flow rate through the purification member once the heating device is no longer used to heat the purification member. This is normally the case when the purification device reaches its minimum operating temperature, and the heat provided by the exhaust gases is sufficient to maintain its temperature. The method is carried out while the engine is operating and exhaust gases are flowing through the purification device.

Steps S40, S42 and S44 are similar to steps S30, S32 and S34.

The electrical wires are supplied with an electrical power chosen to be strong enough to elevate the temperature of the resistive wires 21 slightly, which is therefore slightly higher than the temperature of the exhaust gases.

In step S46, the determined theoretical temperature corresponds to the theoretical temperature that the resistive wires should have with no flow of exhaust gases, in light of the electrical power powering the resistive wires.

Step S46 is carried out using mathematical formulas, curves or tables stored in the memory of the controller 55.

In step S48, the exhaust gas flow rate is determined by calculation, by taking an energy balance at the resistive wires. Indeed, the difference between the theoretical temperature and the temperature previously determined is essentially explained by the heat energy ceded to the exhaust gases by the resistive wires, essentially by convection. The quantity of energy ceded depends both on the weight flow rate of exhaust gases and the temperature of the exhaust gases. Step S48 thus includes a sub-step S52 for acquiring the temperature of the exhaust gases and a sub-step S54 for determining the exhaust gas flow rate as a function of the temperature of the resistive wires previously determined in step S44, and the theoretical temperature of the resistive wires determined in step S46. Sub-step S54 is carried out by calculation or using tables or curves stored in the memory of the controller 55.

As indicated above, the invention also relates to one of the methods described above and shown in FIGS. 8, 9, 10 and 11. These methods are provided to be carried out with a purification device as described above.

The invention claimed is:

1. An exhaust gas purification device for a vehicle, the exhaust gas purification device comprising:
an exhaust gas purification member having a plurality of longitudinal circulation channels to circulate exhaust gases, each circulation channel having a free section, and wherein each circulation channel is open at its opposite longitudinal ends;
a heater, comprising a plurality of electrically conducting resistive wires engaged longitudinally each in one or several circulation channels and a power source of the resistive wires, the resistive wires engaged in a same circulation channel occupying a total section smaller than 25% of the free section of the circulation channel; and the exhaust gas purification member has an upstream face by which the exhaust gases penetrate the exhaust gas purification member and a downstream face by which the exhaust gases leave the exhaust gas purification member, the circulation channels extending longitudinally from the upstream face to the downstream face, the or each resistive wire being arranged in an S shape and comprising a plurality of successive longitudinal segments connected to one another by switchbacks, each longitudinal segment extending in one of the circulations channels from the upstream face up to the downstream face.

2. The device according to claim 1, wherein at least 40% of the circulation channels are traveled by at least one resistive wire.

3. The device according to claim 1, wherein each resistive wire does not include an electrically insulating layer.

4. The device according to claim 1, wherein any two successive longitudinal segments of a same resistive wire are engaged in different circulation channels.

5. The device according to claim 1, wherein each circulation channel contains no more than a single longitudinal segment.

6. The device according to claim 1, wherein the power source comprises at least one first distributor at a first electric potential and at least one second distributor at a second electric potential, one of the first and second distributors is mounted on the upstream face and the other of the first and second distributors is mounted on the downstream face, at least some of the resistive wires each being electrically connected by an upstream end to the or one of the first distributors and by a downstream end to the or one of the second distributors, the at least one first distributor is a strip and the at least one second distributor is a strip, the largest part of the strips extending in a same main direction, the resistive wires connected to the strips being arranged in a plane perpendicular to the main direction.

7. The device according to claim 1, wherein the ends of the circulation channels are reinforced.

8. A vehicle exhaust line comprising:
an exhaust gas purification device that comprises an exhaust gas purification member having a plurality of longitudinal circulation channels to circulate exhaust gases, each circulation channel having a free section, and wherein each circulation is open at its opposite longitudinal ends;
a heater, comprising a plurality of electrically conducting resistive wires engaged longitudinally each in one or several circulation channels and a power source of the resistive wires, the resistive wires engaged in a same circulation channel occupying a total section smaller than 25% of the free section of the circulation channel; and
the exhaust gas purification member has an upstream face by which the exhaust gases penetrate the exhaust gas purification member and a downstream face by which the exhaust gases leave the exhaust gas purification member, the circulation channels extending longitudinally from the upstream face to the downstream face, the or each resistive wire being arranged in an S shape and comprising a plurality of successive longitudinal segments connected to one another by switchbacks, each longitudinal segment extending in one of the circulation channels from the upstream face up to the downstream face.

9. The vehicle exhaust line according to claim 8, wherein the longitudinal segments of each resistive wire extend each along a whole longitudinal length of a corresponding circulation channel.

10. The vehicle exhaust line according to claim 8, wherein opposite ends of each longitudinal segment extend one beyond the upstream face and the other beyond the downstream face.

11. The vehicle exhaust line according to claim 8, wherein the switchbacks have a curved U-shaped such that successive longitudinal segments in the circulation channels are connected to one another by the switchbacks to form the S shape.

12. The device according to claim 1, wherein the longitudinal segments of each resistive wire extend each along a whole longitudinal length of a corresponding circulation channel.

13. The device according to claim 1, wherein opposite ends of each longitudinal segment extend one beyond the upstream face and the other beyond the downstream face.

14. The vehicle exhaust line according to claim 1, wherein the switchbacks have a curved U-shaped such that successive longitudinal segments in the circulation channels are connected to one another by the switchbacks to form the S shape.

15. An exhaust gas purification device for a vehicle, the exhaust gas purification device comprising:
an exhaust gas purification member having a plurality of longitudinal circulation channels to circulate exhaust gases, each circulation channel having a free section;
a heater, comprising a plurality of electrically conducting resistive wires engaged longitudinally each in one or several circulation channels and a power source of the resistive wires, the resistive wires engaged in a same circulation channel occupying a total section smaller than 25% of the free section of the circulation channel;
the exhaust gas purification member has an upstream face by which the exhaust gases penetrate the exhaust gas purification member and a downstream face by which the exhaust gases leave the exhaust gas purification member, the circulation channels extending longitudinally from the upstream face to the downstream face, the or each resistive wire being arranged in an S shape and comprising a plurality of successive longitudinal segments connected to one another by switchbacks, each longitudinal segment extending from the upstream face to the downstream face; and
wherein the power source comprises at least one first distributor at a first electric potential and at least one second distributor at a second electric potential, one of the first and second distributors is mounted on the upstream face and the other of the first and second distributors is mounted on the downstream face, at least some of the resistive wires each being electrically connected by an upstream end to the or one of the first distributors and by a downstream end to the or one of the second distributors, the at least one first distributor is a strip and the at least one second distributor is a strip, the largest part of the strips extending in a same main direction, the resistive wires connected to the strips being arranged in a plane perpendicular to the main direction.

* * * * *